United States Patent Office — 3,486,930, Patented Dec. 30, 1969

3,486,930
VINYL POLYMERS MODIFIED WITH DRYING
ALKYD RESINS OR DRYING OILS
George J. Antlfinger, Avon Lake, and Maynard C. Bodzash, Elyria, Ohio, assignors to The B. F. Goodrich Company, New York, N.Y., a corporation of New York
No Drawing. Filed Oct. 3, 1967, Ser. No. 672,425
Int. Cl. C08d 13/18; C08c 17/18
U.S. Cl. 117—155         5 Claims

ABSTRACT OF THE DISCLOSURE

Vinyl halide polymer and copolymer latices modified with a drying oil or alkyd resin of the drying type have been found to be useful as binders for paper and other nonwoven fabric applications. Nonwoven substrates saturated with the modified vinyl halide polymer latices show increased wet strength compared to nonwoven substrates impregnated with unmodified vinyl halide polymer latices.

BACKGROUND OF THE INVENTION

Vinyl halide polymers and copolymers and latices thereof are well known, especially, copolymer latices wherein a vinyl halide is interpolymerized with one or more other vinyl monomers such as acrylonitrile, methacrylonitrile, acrylic and methacrylic acid or esters thereof. Such copolymer latices have been recognized for their untility as protectice coatings and as binders for papers and fabrics. For these binder applications the latex is typically deposited by either a spraying or dipping technique on the paper or fibrous material. The aqueous portion of the latex is then removed and the polymer remains fixed to the substrate. The particular binder used plays an important role in the ultimate properties of the paper product or fibrous material. The choice of binder, for example, will influence the tensile strength, both wet and dry, elongation, internal bond strength, the tearing characteristics, heat stability, and "hand", as well as other properties or characteristics of a paper or nonwoven.

SUMMARY OF THE INVENTION

This invention relates to vinyl polymers modified with drying alkyd resins or drying oils. More particularly, this invention relates to vinyl halide polymer latices, useful as saturants for paper and other fibrous materials, said vinyl halide polymer latices being modified with drying alkyd resins or drying oils.

The present invention is particularly adapted to the improvement of the wet strength of papers and other fibrous materials. Papers and nonwoven materials impregnated with vinyl halide polymer or copolymer latices modified with drying oils and drying alkyd resins are characterized by having unusually high wet strength when compared with materials treated with unmodified vinyl halide polymer or copolymer latices. The copolymer latices useful for the present invention are obtained by the polymerization of a vinyl halide such as vinyl chloride or vinylidene chloride by themselves or with one or more other polymerizable monomers such as acrylonitrile, acrylic or methacrylic acid and the lower alkyl esters of acrylic or methacrylic acid. The drying oil or alkyd resin suitable for modification will contain adequate unsaturation sufficient to undergo oxidation, that is, generally having iodine numbers greater than 100.

DETAILED DESCRIPTION

The drying oil or alkyl modified copolymer latices useful in the present invention will contain a vinyl halide monomer. The vinyl halide monomers employed have the structural formula

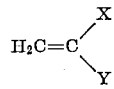

wherein X is a halogen such as chlorine or bromine and Y is a hydrogen or halogen. Monomers of the above type include vinyl chloride, vinyl bromide, vinyl fluoride, vinylidene chloride, vinylidene bromide and vinylidene fluoride. The copolymers may include mixtures of two or more vinyl halide monomers. Excellent results have been obtained when vinyl chloride and vinylidene chloride are the monomers employed.

Interpolymerized with the vinyl halide monomers to form the copolymer latices of the present invention may be one or more other polymerizable vinyl monomers containing a vinylidene grouping ($CH_2=C<$). Such monomers may include acrylic or methacrylic acid; lower alkyl acrylates or methacrylates having the structural formula

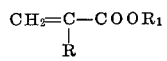

wherein R is hydrogen or a methyl group and $R_1$ is an alkyl radical having from 1 to 8 carbon atoms; such as methyl acrylate, ethyl acrylate, the propyl acrylates, the butyl acrylates, 2-methylhexyl acrylate, n-octyl acrylate, 2-ethylhexyl acrylate, methyl methacrylate, ethyl methacrylate, n-butyl methacrylate, octyl methacrylate and the like; acrylonitrile or methacrylonitrile; conjugated dienes such as butadiene and isoprene; alphaolefins such as ethylene, propylene and isobutylene; vinyl esters such as vinyl acetate; vinyl aromatics such as styrene, α-methyl styrene, vinyl toluene and vinyl naphthalene; alkyl vinyl ethers such as methyl vinyl ether, isopropyl vinyl ether and n-butyl vinyl ether; and the like. Excellent results have been obtained when ethyl acrylate, 2-ethylhexyl acrylate, n-butyl acrylate and acrylonitrile are interpolymerized with vinyl chloride or vinylidene chloride.

The polymers useful for the present invention may contain from about 25% by weight of the vinyl halide, however, it is generally preferred that the vinyl halide be present in amounts greater than about 50% by weight. The vinyl halide can range up to 100%. If one or more other copolymerizable vinyl monomers are to be interpolymerized with the vinyl halide, it is generally preferred that this vinyl monomer not be present in amounts greater than about 50% by weight. This is not to say that larger amounts of these comonomers cannot be used if desirable. Up to about 75% by weight vinyl comonomers may be employed, in fact, the drying oils and alkyd resins have proved useful for the modification of polymer latices which contain no vinyl halide monomer but instead are comprised wholly of acrylic ester monomers or the like.

The vinyl halide polymer latices useful for modification with alkyd resins or drying oils may be prepared in the conventional manner. Any of the catalysts commonly employed for the polymerization of vinyl compounds may be used to prepare the polymers of this invention. These include azo compounds, various peroxygen compounds such as persulfates, peroxides, hydroperoxides and the like. Activated "Redox" systems may also be employed. Generally the amount of catalyst will range between about 0.1 to 5% by weight based on the monomers. The catalyst may be completely charged at the outset of the polymerization or incremental addition or proportioning throughout the polymerization may be employed if desired. The polymers may be prepared using an emulsifier-free system, however, when an emulsifier is used it may be any of the general types of anionic, cationic or non-ionic emulsifying agents and may be employed in amounts up to about 6% or more by weight based on total monomers Small amounts of other ingredients such as buffers, activators, and the like may be present in the polymerization mixture.

The temperature at which the polymerizations will be conducted is not critical and will generally range between about −30° C. to about 100° C., however, best results are usually obtained at temperatures between about 0° C. and 70° C. To assure optimum reaction rates, the polymerization will normally be conducted in the absence of oxygen. The polymerization may, however, be conducted in the presence of air if desired. Techniques for charging monomers, emulsifier, catalyst or other ingredients may be varied depending on the particular system employed. For example, all the monomers may be charged to the reactor at the start of the polymerization or one or more of the monomers may be added gradually during the course of the polymerization in order to give a better control of the polymerization rate and to improve the homogeneity of the product.

Modification of the vinyl halide copolymer latices for the purpose of this invention is achieved by addition to the latex of a small but effective amount of an alkyd resin of the drying type or a drying oil. Both the drying type alkyd resins and drying oils are characterized by the presence of unsaturation in the chemical structure so that they react with oxygen to polymerize which results in subsequent drying and hardening. It is generally found most convenient to mix the alkyd resin or drying oil with an emulsifying agent prior to the addition to the polymer latex, however, if the polymer latex contains sufficient excess emulsifier the alkyd resin or drying agent may be added directly thereto and stirred in with no difficulty.

The unsaturated alkyd resins (drying type) which are employed in the present invention are typically polyesters derived from the reaction of polyhydric alcohols, polybasic acids and monobasic fatty acids, the latter being introduced as such or as an oil, that is, in the form of a triglyceride. The amount and type of unsaturation in the alkyd resin plays an important role in the properties of the alkyd and therefore will modify the vinyl halide copolymer latices to different extents. In general, however, alkyd resins wherein the fatty acid or oil has an iodine number (grams per 100 grams of iodine absorbed) greater than about 100 will contain adequate unsaturation and be acceptable for the purpose of this invention, that is, the drying properties of the alkyd will be sufficient to render improvement in the wet strength of papers and nonwoven materials impregnated with the modified vinyl halide polymer latex. Best results have been obtained when the fatty acid or oils have iodine numbers greater than 125. Suitable oil and fatty acid types for the present invention are: linseed, soya, tung, dehydrated castor, safflower, oiticica, perilla, sardine, menhaden, cottonseed and the like.

The polyhydric alcohol component of the alkyd resin may contain 2, 3, 4 or even more hydroxyl groups per molecule. Such compounds include ethylene glycol, propylene glycol, dipropylene glycol, neopentylene glycol, trimethylol ethane, trimethylol propane, sorbitol, glycerol, dipentaerthritol, pentaerythritol or the like. Excellent results have been obtained with alkyd resins derived from pentaerythritol and glycerol, probably due to the higher functionality. Polyhydric alcohols having higher functionalities are especially advantageous when used with slower drying fatty acids and oils which have lower iodine numbers. Where desirable a mixture of two or more polyhydric alcohol components may be employed for the resin formulation.

Also essential for the perparation of the alkyd resins useful as modifiers in the present invention are polybasic acids or anhydrides derived therefrom. Such compounds include adipic acid, maleic acid, maleic anhydride, fumalkyd resins and drying oils immediately prior to use, or maric acid, succinic acid, sebacic acid, isophthalic acid, phthalic anhydride, chlorendic anhydride and the like. Alkyd resins wherein the polybasic acid component is phthalic anhydride or isophthalic acid have been found extremely useful as modifiers.

In general, the components of the drying alkyd resin may be varied over a wide range and still obtain alkyds having properties useful for the present invention. Oil or monobasic fatty acids may constitute up to as much as 70% by weight or more of the alkyd, however, it is more generally found the oil component contributing unsaturation to the alkyd should be present in amounts between about 30 to 60% by weight. The polybasic acid or acid anhydride will most generally range between about 30 to 40% by weight with the polyhydric alcohol making up the remaining composition of the alkyds, generally about 15 to 30% by weight.

Alkyd resins modified with compounds such as acrylonitrile, methyl methacrylate, styrene, vinyl toluene or the like also find application for the present invention. Alkyd blends may also be advantageously employed. Useful alkyd blends include alkyd/cellulose derivatives, alkyd/rubber, alkyd/urea, alkyd/melamine and the like.

Drying oils, either natural or synthetic, are also effective modifiers for the vinyl halide polymer latices. Although drying oils having a glyceride type structure are most commonly used, other oils of the non-glyceride type may also be effectively employed so long as they have adequate unsaturation to be oxidized and thereby produce polymerization. The type of unsaturation is important to the extent that it will effect the rate of drying, however, for purposes of this invention the amount of unsaturation present in the drying oil plays a far more important role than the type of unsaturation present. Useful drying oils will typically have iodine numbers greater than 115, more preferably, the iodine numbers will range between about 130 and 200. Drying oils within the abovementioned range include: linseed oil; tung oil; soybean oil; safflower oil; oiticica oil; perilla oil; dehydrated castor oil; isano oil; kamala seed oil; fish oils such as sardine, pilchard, and menhanden; tall oil; and the like. Imparting unsaturation and consequently the drying characteristics to these oils is the presence of triglycerides wherein the fatty acid portion of the molecule is derived from linoleic acid, linolenic acid, eleostearic acid, ricinoleic acid, and other highly unsaturated fatty acids or mixtures thereof.

For purposes of the present invention, the drying alkyd or drying oil can be used in amounts from about 1 to about 60% by weight of the copolymer latex, however, optimum properties of the nonwoven is achieved when the latex employed as saturant is modified with about 5 to 30% by weight of the alkyd or drying oil. When an amount of the alkyd resin or drying oil from this preferred range is added to a vinyl halide copolymer latex of the type described above and the latex used to saturate papers, the wet tensile strength of the papers is often more than doubled with a marked improvement in the percent wet strength retained. There is no limitation on the total solids of the latex to be modified, however, convenience and ease of application will generally require that the total solids present in the latex not exceed about 50% by weight. High polymer pick-up on the nonwoven substrate, which is an important factor looked to when conducting a saturating process, is generally best achieved with latices which contain about 15–25% by weight total solids. Fillers, antioxidants, stabilizing agents, plasticizers and con-constituents may be advantageously incorporated in the vinyl halide copolymer latices prior to saturation of the substrate. This enables the production of a large variety of compositions capable of meeting the requirements of many needs. No special precautions need be observed when incorporating the drying oil or alkyd resin in the latices—the usual mixing techniques being adequate. The vinyl halide polymer latices may be modified with the the latex and modifier may be conveniently mixed and allowed to stand at room temperature for extended periods without appreciable deterioration.

The vinyl halide polymer latices modified with the drying oils or alkyd resins of the drying type are useful for the production of high wet strength papers obtained through conventional processing of bleached or unbleached pulp, kraft, sulphite, α-cellulose fibers, rag fibers or the like, or other fibrous materials of the nonwoven type. The fibrous materials comprising the nonwoven substrate may consist of cotton, regenerated cellulose, α-cellulose, wood pulp and a wide variety of synthetic materials. The substrates are impregnated or coated with the modified latices and then dried and cured for several minutes at about 250 to 350° C. or allowed to air-cure at ambient temperature. After curing, the papers or nonwoven materials may be stored for prolonged periods under normal conditions without undergoing deterioration.

The following examples will illustrate the invention more clearly. All parts and percentages reported are on a weight basis.

EXAMPLE I

A terpolymer of vinyl chloride, vinylidene chloride and 2-ethylhexyl acrylate was prepared as follows:

| | Parts |
|---|---|
| Vinyl chloride | 45 |
| Vinylidene chloride | 15 |
| 2-ethylhexyl acrylate | 40 | and modified with an isophthalic acid/linseed and soya oil-derived alkyd having an iodine number of about 110. The alkyd was prepared as a 65% oil-in-water emulsion using ammonium oleate as the emulsifier and then added to the vinyl chloride, vinylidene chloride, 2-ethylhexyl acrylate polymer latex so that the resulting modified latex contained 50 parts of the polymer and 50 parts of the alkyd on a dry weight basis. The resulting modified polymer latex was then diluted to about 15% total solids and placed in saturating tanks. 10" x 16" sheets of a flat bleached kraft paper of 10 mil thickness, having a minimum of fiber to fiber contact and a tensile strength of about 30 lb./in. were then floated in the latex bath for 10 seconds on each side and then hung to drip dry. The dried papers were then cured in an air oven for 3 minutes at 325° F. 1" x 6" samples are then cut lengthwise from the cured sheets for testing purposes. Wet tensile strength of the samples were determined on the Thwing-Albert Hydraulic Tensile Tester in accordance with TAPPI procedure T456–m44 after soaking the samples to be tested in water for at least 16 hours. Other samples were conditioned overnight in a constant temperature and humidity controlled room. These samples were used for tensile and elongation testing. Samples were pulled at a rate of 12 inches per minute for these tests. Results of the above-mentioned tests are tabulated in Table I along with a control which was treated with the same polymer latex but without the isophthalic alkyd modifier.

TABLE I

| | Paper saturated with modified latex | Paper saturated with control latex |
|---|---|---|
| Tensile strength (p.s.i.): | | |
| Dry | 43.0 | 46.6 |
| Wet | 20.8 | 7.4 |
| Elongation, percent | 8.0 | 8.0 |
| Wet strength retained, percent [1] | 48.5 | 15.9 |

[1] $\dfrac{\text{Wet Strength}}{\text{Dry Strength}} \times 100.$

Test samples were then prepared for a standard evaluation of the modified vinyl chloride/vinylidene chloride/ 2-ethylhexyl acrylate latex as nonwoven binders. Latex baths were prepared in the same manner and 10 mil flat papers were immersed therein. After drip-drying the papers were cured for 5 minutes at 275° F. Wet and dry tensiles and elongation were then obtained and the results are set forth in Table II below.

TABLE II

| | Nonwoven saturated with modified latex | Nonwoven saturated with unmodified latex |
|---|---|---|
| Tensile strength (p.s.i.): | | |
| Dry | 41.6 | 48.3 |
| Wet | 13.6 | 4.1 |
| Elongation, percent | 9.0 | 9.3 |
| Wet strength retained, percent | 32.7 | 8.5 |

Samples of the above were laundered in a standard soap solution and dry cleaned in perchloroethylene and then heat aged in a 225° F. air oven for 2, 8, 16 and 24 hour intervals. In all tests the nonwoven saturated with the modified vinyl chloride/vinylidene chloride/2-ethylhexyl acrylate latex compared favorably with unmodified control samples.

When similar vinyl chloride/vinylidene/chloride/2-ethylhexyl acrylate polymer latices were modified with the isophthalic-type alkyd (75 parts polymer:25 parts alkyd) and used as saturants, the resulting papers had wet tensile strengths two times greater than obtained with identical papers saturated with the same terpolymer latex but not containing the alkyd modifier.

EXAMPLE II

A latex of a polymer similar to Example I, but containing 2 parts acrylic acid interpolymerized was prepared using a persulfate catalyzed emulsion system. The latex was blended with varying amounts of a 65% oil-in-water emulsion of a safflower-type alkyd which contained 17% phthalic and had an iodine value of about 110 so that the effect of varying alkyd levels could be studied. The alkyd levels ranged from 0 to 20 parts on a dry basis. The modified polymer latices were then diluted to 15% total solids and used to saturate 10 mil flat paper in the customary manner. The papers were drip-dried and evaluated for the saturated paper properties after air curing for 3 minutes at 325° F. and for nonwoven applications after a 5 minute cure at 275° F. Results of these tests are presented in Table III. Papers saturated with the alkyd modified vinyl chloride polymer latex showed good oven heat stability at 300° F.

TABLE III

| Parts polymer/ parts alkyd modifier (on dry basis) | 3 minute (325° F.) cure | | | | 5 minute (275° F.) cure | | | |
|---|---|---|---|---|---|---|---|---|
| | Tensile strength (p.s.i.) | | Elongation, percent | Percent Wet strength retained | Tensile strength (p.s.i.) | | Elongation, percent | Percent wet strength retained |
| | Dry | Wet | | | Dry | Wet | | |
| 100 | 41.1 | 5.6 | 13.0 | 13.6 | 37.0 | 10.0 | 10.6 | 27.0 |
| 99/1 | 42.3 | 6.6 | 12.6 | 15.6 | 36.8 | 11.6 | 11.0 | 31.5 |
| 97/3 | 40.3 | 8.3 | 12.0 | 20.6 | 38.1 | 13.2 | 12.0 | 34.7 |
| 95/5 | 41.3 | 9.9 | 12.6 | 23.9 | 37.0 | 14.1 | 11.3 | 38.1 |
| 90/10 | 41.1 | 12.1 | 12.6 | 29.5 | 36.6 | 15.9 | 10.6 | 43.5 |
| 85/15 | 40.3 | 13.3 | 12.6 | 32.9 | 39.5 | 17.0 | 11.0 | 43.2 |
| 80/20 | 40.0 | 14.6 | 12.3 | 36.5 | 40.3 | 17.0 | 11.6 | 42.2 |

EXAMPLE III

The latex of Example II was mixed with raw tung oil prepared as a 65% oil-in-water emulsion with ammonium oleate and having an iodine number of about 165. The modified latex contained 25 parts tung oil per 75 parts (dry weight) of the polymer. 10 mil flat paper was saturated in the usual manner and cured for 3 minutes at 325° C. Two sets of samples were tested—one set conditioned overnight at 72° F. and 50% relative humidity and the other set aged for 24 hours at 212° F. in an air oven before conditioning and testing. In addition to the tensile and elongation determinations, the internal bond strengths of these saturated papers were determined on a sample prepared by sandwiching the saturated paper between two pieces of Bondex tape and sealing for 30 seconds at 275° F. on a heated plate with the weight of an ordinary pressing iron. The samples were then pulled on the Thwing-Albert at a rate of 12 inches per minute. Table IV sets forth the results obtained for the above samples as well as for samples prepared with the unmodified latex.

TABLE IV

| Sample | Tensile strength (p.s.i.) | | Elongation, percent | Internal bond, (oz./in.) | Percent wet strength retained |
|---|---|---|---|---|---|
| | Wet | Dry | | | |
| Unaged paper saturated with tung oil modified latex | 30.5 | 61.0 | 7.6 | 21.3 | 50.0 |
| Unaged paper saturated with control (unmodified) latex | 6.3 | 58.3 | 6.7 | 14.4 | 10.8 |
| Aged (24 hrs. at 212° F.) paper saturated with tung oil modified latex | 25.5 | 52.8 | 5.0 | 19.2 | 36.4 |
| Aged (24 hrs. at 212° F.) paper saturated with control (unmodified) latex | 12.6 | 44.5 | 5.0 | 13.9 | 28.3 |

EXAMPLE IV

Sixty parts vinylidene chloride and 40 parts n-butyl acrylate were emulsion polymerized using a persulfate catalyst. The polymer latex was then modified by the addition of the isophthalic-type alkyd of Example I, 25 parts of the alkyd to 75 parts of the polymer. Paper saturated with isophthalic alkyd modified vinylidene chloride/n-butyl acrylate latex showed up to three times greater wet strength than identical papers saturated with the unmodified polymer latex. Also, similar latices prepared from polymers having high vinylidene chloride content were used to saturate paper samples, the resulting papers also showed improved resistance to edge tear when tested in accordance with TAPPI procedure T-470 SM-45.

EXAMPLE V

A plasticized vinyl chloride/ethyl acrylate (95/5) copolymer was prepared in accordance with previous procedures. The polymer latex calculated to contain 100 parts dry polymer was modified with 35 parts tung oil and used to saturate 10 mil. flat paper. The saturated paper had a dry tensile strength of 44.0 p.s.i., a wet tensile strength of 31.1 p.s.i. and 70.8% wet strength retention.

EXAMPLE VI

A copolymer latex was prepared by emulsion polymerizing with a persulfate catalyst 80 parts vinyl chloride and 20 parts methyl acrylate. The coplymer latex was then plasticized with dioctyl phthalate by mixing 100 parts of the polymer calculated on a dry basis with 35 parts dioctyl phthalate and 1.5 parts emulsifier. One portion of the plasticized vinyl chloride/methyl acrylate latex was then modified with tung oil and another latex portion modified with dehydrated castor oil (iodine value about 120). Papers were saturated with both the modified latices as well as with an unmodified control latex. Test results are tabulated in Table V.

TABLE V

| Sample | Cured 5 min. at 275° F. | | | | | Cured at 3 min. at 325° F. | | | | |
|---|---|---|---|---|---|---|---|---|---|---|
| | Tensile (p.s.i.) | | | Elongation | Percent wet strength retained | Tensile (p.s.i.) | | Elongation | Internal bond, oz./in. | Percent wet strength retained |
| | Wet | Dry | Solvent¹ | | | Wet | Dry | | | |
| Control (paper saturated with unmodified latex) | 11.4 | 54.1 | 30.3 | 8.0 | 21.1 | 19.7 | 55.8 | 7.6 | 13.3 | 33.6 |
| Paper saturated with tung oil modified latex (25 tung/100 polymer) | 28.0 | 54.0 | 37.1 | 8.0 | 52.0 | 31.0 | 59.3 | 7.6 | 19.2 | 52.3 |
| Paper saturated with dehydrated castor oil modified latex (25 DCO/100 polymer) | 25.2 | 48.2 | | 7.6 | 52.3 | 28.3 | 53.2 | 7.6 | 15.3 | 53.3 |

¹ Sample immersed in perchloroethylene for 20 minutes at room temperature before pulling on the Thwing-Albert at 12 inches per minute.

EXAMPLE VII

Vinyl chloride monomer was charged to a reactor containing potassium persulfate catalyst, emulsifier and ammonia and polymerized at 125° C. The poly(vinyl chloride) latex obtained was then modified by the addition of 35 parts tung oil and 85 parts tricresyl phosphate to an amount of the latex calculated to contain 100 parts poly(vinyl chloride). The tung oil modified latex was then diluted to 15% total solids and used to saturate 10 mil flat paper. After drip-drying and curing for 3 minutes at 325° F., the papers saturated with the modified poly (vinyl chloride) latex were tested and found to have wet tensile strengths of 19.0 p.s.i., dry tensile strengths of 44.0 p.s.i. and 43.2% wet strength retention.

The above examples clearly show drying oils and alkyd resins of the drying type can be readily mixed with vinyl halide polymer latices to provide modified latices useful as binders for papers and other nonwoven materials. Papers and nonwoven materials saturated with the drying oil and alkyd modified latices show marked improvements in wet tensile strength without significantly affecting other useful properties of the saturated material such as the dry tensile strength, the edge tear, the internal bond and others—in fact, these other properties may even be improved with certain latices. A wide variety of drying oils or alkyd resins may be employed for the purpose of modification and the amount of modifier used may range from 1 part to about 50 parts or more. Polymer latices which may be modified will generally contain a major portion of a vinyl halide monomer, such as vinyl chloride or vinylidene chloride, polymerizer. Other polymerizable monomers such as acrylic acids and esters thereof may be interpolymerized with the vinyl monomers and the copolymer latices produced will likewise provide useful binders for papers and other nonwoven materials when modified with drying oils or alkyl resins.

We claim:

1. A fibrous nonwoven article having improved wet strength comprising a nonwoven material impregnated with an aqueous latex containing (A) up to about 50% by weight of a copolymer having greater than about 50% by weight based on the total monomers of a monomer selected from vinyl chloride, vinylidene chloride and a mixture thereof, and at least about 5% of one or more polymerizable vinyl comonomers selected from n-butyl acrylate, 2-ethylhexyl acrylate and acrylic acid and about 5 to 30% by weight based on the latex of (B) a member selected from (1) a drying oil having an iodine number greater than about 115 and (2) an alkyd resin derived from the reaction of pentaerythritol or glycerol with phthalic anhydride or isophthalic acid and a monobasic fatty acid or oil having an iodine number greater than 100.

2. An article of claim 1 wherein the nonwoven material is paper.

3. An article of claim 2 wherein the aqueous latex contains from about 15 to 25% by weight of the copolymer.

4. An article of claim 3 wherein the copolymer contains vinylidene chloride, vinyl chloride and 2-ethylhexyl acrylate and the drying oil is selected from linseed oil, soybean oil, tung oil, dehydrated castor oil or tall oil.

5. An article of claim 3 herein the copolymer contains vinylidene chloride, vinyl chloride and n-butyl acrylate and the drying oil is selected from the group consisting of linseed oil, soybean oil, tung oil, dehydrated castor oil or tall oil.

References Cited

UNITED STATES PATENTS

| | | | |
|---|---|---|---|
| 2,343,997 | 3/1944 | Powell et al. | 260—21 |
| 2,479,410 | 8/1949 | Rothrock et al. | 260—23 |
| 2,508,092 | 5/1950 | Beynon | 260—23 |
| 2,838,428 | 6/1958 | Bohrer | 260—23 |
| 3,139,411 | 6/1964 | Brockman et al. | 260—22 |
| 3,171,823 | 3/1965 | Murphy et al. | 260—22 |
| 3,258,438 | 6/1966 | Shaw et al. | 260—22 |
| 3,313,757 | 4/1967 | Trofimow et al. | 117—155 |
| 3,332,899 | 7/1967 | Cummings et al. | 260—23 |
| 3,423,346 | 1/1969 | Klauss et al. | 260—22 |

FOREIGN PATENTS 696,985  11/1964  Canada.

DONALD E. CZAJA, Primary Examiner
R. W. GRIFFIN, Assistant Examiner

U.S. Cl. X.R.

117—143, 161; 260—22, 23, 29.2, 29.6, 97.5

PO-1050
(5/69)

UNITED STATES PATENT OFFICE
CERTIFICATE OF CORRECTION

Patent No. 3,486,930           Dated December 30, 1969

Inventor(s) George J. Antlfinger and Maynard C. Bodzash

It is certified that error appears in the above-identified patent and that said Letters Patent are hereby corrected as shown below:

Column 2, line 6, "alkyl" should read ---alkyd---.

Column 4, line 7, "dipentaerthritol" should read ---dipentaerythritol---; line 21 should be deleted.

Column 8, Table V, seventh column, "55.8" should read ---58.8---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents